US 7,568,749 B2

(12) United States Patent
Biggs et al.

(10) Patent No.: US 7,568,749 B2
(45) Date of Patent: Aug. 4, 2009

(54) RETRACTABLE CUP HOLDER ASSEMBLY

(75) Inventors: Christopher Biggs, New Hudson, MI (US); Walter Yourke, Highland, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 6 days.

(21) Appl. No.: 11/740,162

(22) Filed: Apr. 25, 2007

(65) Prior Publication Data
US 2008/0265605 A1 Oct. 30, 2008

(51) Int. Cl.
*B60R 11/06* (2006.01)
(52) U.S. Cl. .................................. 296/37.8; 248/311.2
(58) Field of Classification Search ............... 296/37.8, 296/37.13, 37.1, 24.34, 37.12; 224/400, 224/401
See application file for complete search history.

(56) References Cited

U.S. PATENT DOCUMENTS

| 4,733,908 | A | * | 3/1988 | Dykstra et al. ......... 297/188.16 |
| 5,284,314 | A | * | 2/1994 | Misaras et al. ........... 248/311.2 |
| 5,289,962 | A | * | 3/1994 | Tull et al. .................... 224/549 |
| 5,516,016 | A | | 5/1996 | Anderson et al. |
| 5,603,477 | A | * | 2/1997 | Deutsch .................... 248/311.2 |
| 5,628,486 | A | * | 5/1997 | Rossman et al. ......... 248/311.2 |
| 5,718,405 | A | * | 2/1998 | Adachi .................... 248/311.2 |
| 5,820,094 | A | * | 10/1998 | Tanaka .................... 248/311.2 |
| 6,085,953 | A | * | 7/2000 | Bober et al. ................. 224/282 |
| 6,095,471 | A | * | 8/2000 | Huang ..................... 248/311.2 |
| 6,234,439 | B1 | * | 5/2001 | Townsend et al. ........ 248/311.2 |
| 6,250,527 | B1 | * | 6/2001 | Mizue et al. .............. 248/311.2 |
| 6,361,008 | B1 | * | 3/2002 | Gravenstreter ........... 248/311.2 |
| 6,427,960 | B1 | * | 8/2002 | Gehring et al. .......... 248/311.2 |
| 6,435,633 | B2 | * | 8/2002 | Hoshi ......................... 312/242 |
| 6,513,687 | B1 | * | 2/2003 | Siniarski ..................... 224/282 |
| 6,520,575 | B1 | * | 2/2003 | Yuzawa .................. 297/188.01 |
| 6,547,326 | B1 | | 4/2003 | Walkinshaw et al. |
| 6,619,607 | B2 | | 9/2003 | Yamada |
| 6,705,579 | B2 | * | 3/2004 | Yamada .................... 248/311.2 |
| D496,197 | S | * | 9/2004 | Wenzler ....................... D6/500 |
| 6,799,705 | B1 | * | 10/2004 | Lutoslawski .............. 296/37.12 |
| 6,808,097 | B2 | | 10/2004 | Kim et al. |
| 6,932,311 | B2 | * | 8/2005 | DeVries et al. ........... 248/311.2 |
| 7,147,259 | B2 | | 12/2006 | Radu et al. |
| 7,380,762 | B2 | * | 6/2008 | Takeichi ................... 248/311.2 |
| 2003/0122392 | A1 | | 7/2003 | Larsen et al. |
| 2003/0127877 | A1 | * | 7/2003 | Luginbill et al. ........... 296/37.8 |
| 2006/0071497 | A1 | | 4/2006 | Radu et al. |

* cited by examiner

*Primary Examiner*—Kiran B. Patel
(74) *Attorney, Agent, or Firm*—Global IP Counselors, LLP

(57) ABSTRACT

A retractable cup holder assembly includes an interior trim panel, a support housing and a retractable cup holder. The support housing is releasably retained in a cup holder receiving opening of the interior trim panel by a reusable breakaway connection such that the breakaway connection at least partially releases the support housing from the interior trim panel for movement between an installed orientation and a breakaway orientation upon application of a prescribed force being applied to the breakaway connection. The retractable cup holder is pivotally supported to the support housing about a pivot axis between a stowed position in which the cup holder is retracted and a deployed position in which the cup holder extends outwardly from the support housing. The cup holder moves with the support housing when the support housing moves from the installed orientation to the breakaway orientation.

8 Claims, 10 Drawing Sheets

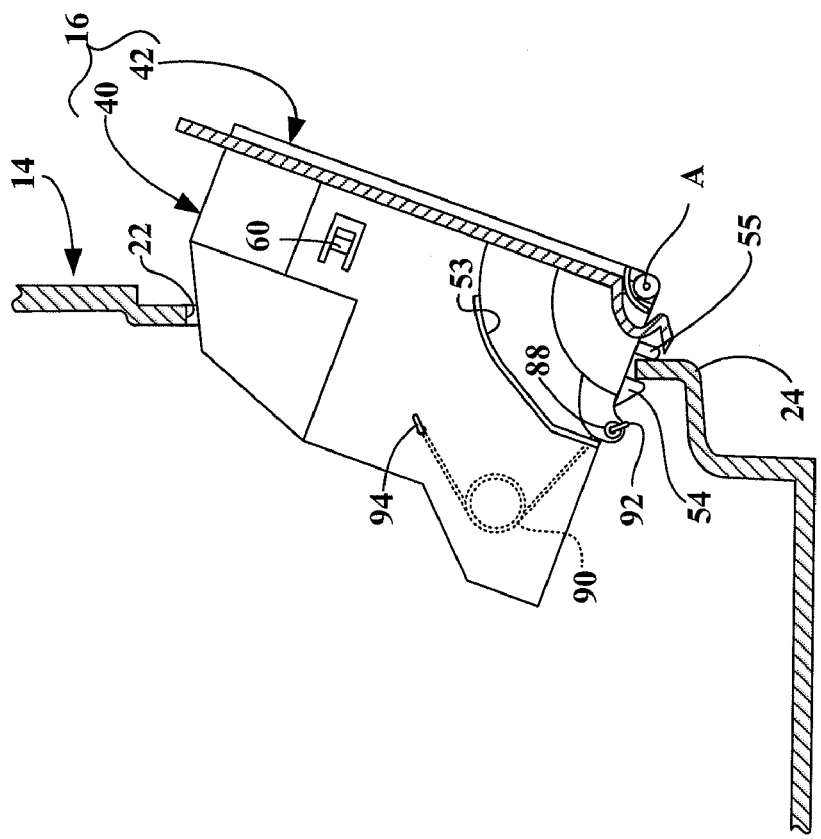
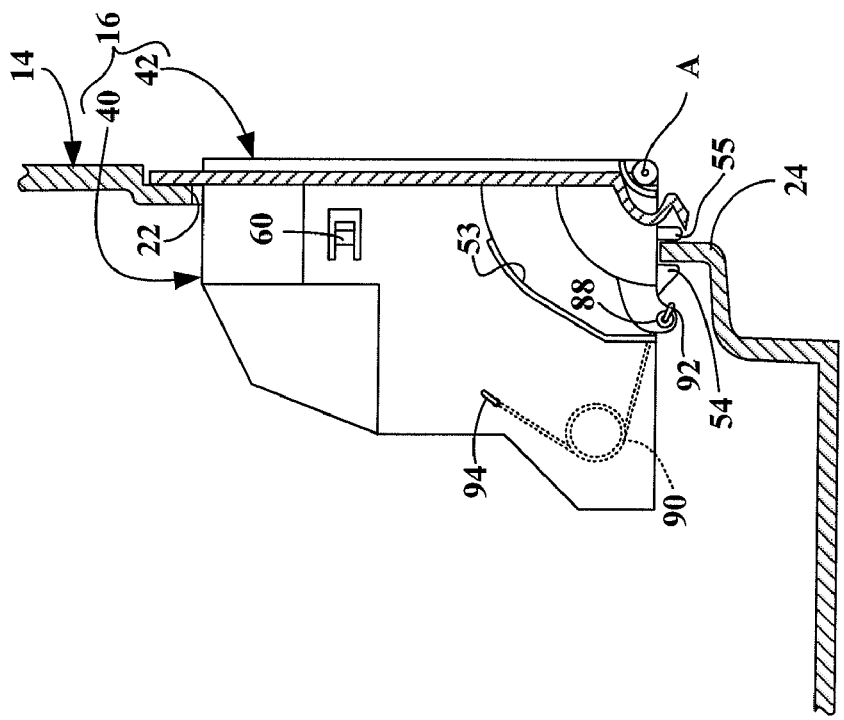

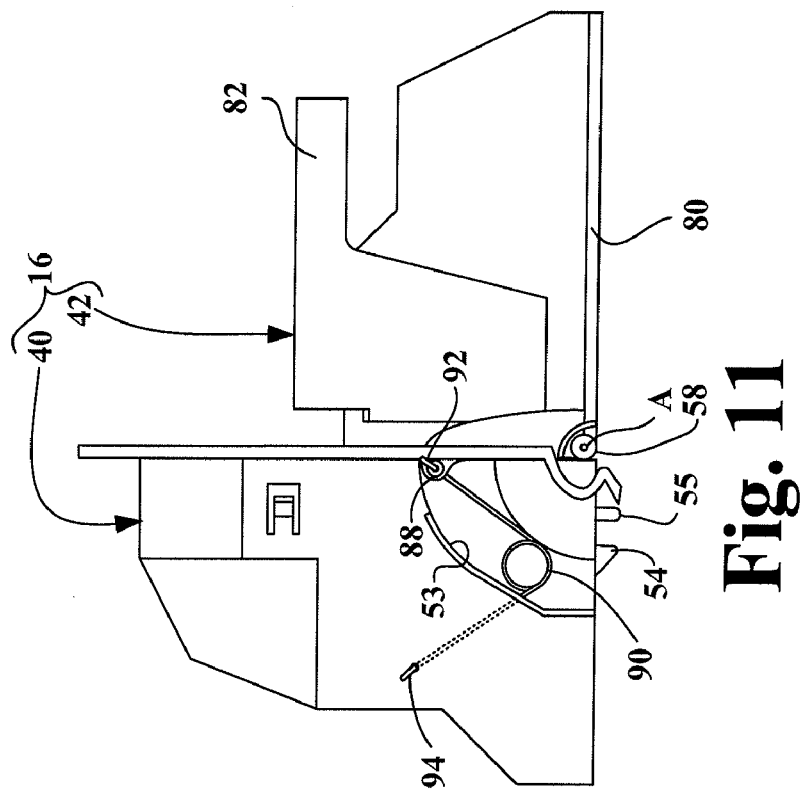
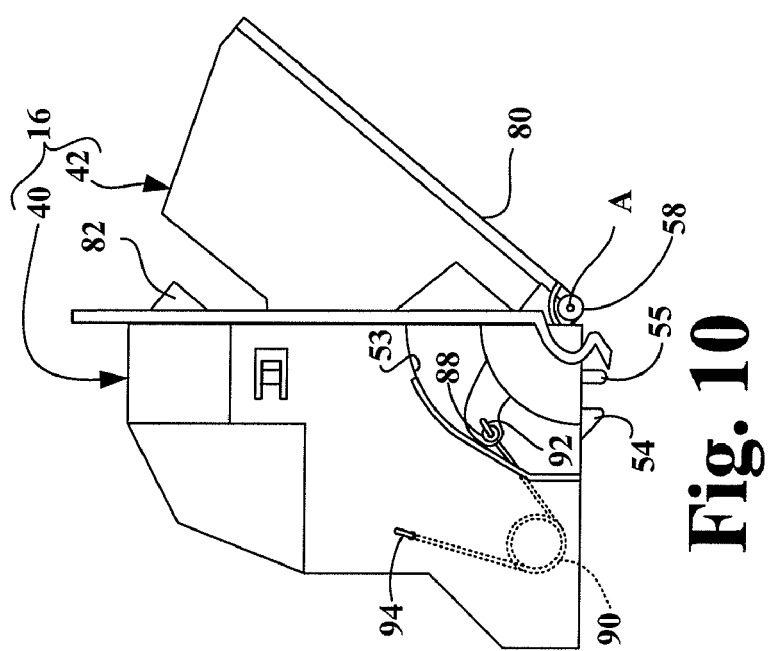

RETRACTABLE CUP HOLDER ASSEMBLY

BACKGROUND OF THE INVENTION

1. Field of the Invention

The present invention relates to a retractable cup holder assembly. More specifically, the present invention relates to a retractable cup holder assembly with a reusable breakaway feature that allows a vehicle occupant to easily re-install the cup holder assembly after the cup holder assembly has been pulled free from a trim portion of a vehicle.

2. Background Information

Vehicle interiors often include cup holder assemblies supported on vehicle interior structures such as instrument panels, side trim panels, center consoles and seats. One common type of cup holder is the swing-down variety that includes a cup tray assembly that includes a portion that pivots relative to a trim panel and/or the remainder of cup holder assembly and is movable between a retracted or stowed position and a generally horizontal deployed position. Some cup holder assemblies include detents that include a planar surface that engages a parallel surface on the trim panel retaining the cup tray assembly in an installed orientation relative to the trim panel.

A common problem encountered with such cup holder assemblies is that excessive downward forces may occasionally be applied to the deployed portion of the cup tray assembly. Such forces, typically generated by inadvertently stepping on the cup holder assembly in the deployed position, can force the cup tray assembly downward past the deployed position and can forcibly withdraw the cup holder assembly from the trim panel. In the process of withdrawing the cup holder assembly from the trim panel, the detents and/or the trim panel can be damaged. Once either is damaged, the detents of the cup holder assembly no longer retain the cup holder assembly to the trim panel in the installed orientation. Hence, the cup holder assembly and/or the trim panel must be replaced.

In view of the above, it will be apparent to those skilled in the art from this disclosure that there exists a need for an improved cup holder assembly that is releasable from the trim panel such that neither the trim panel nor the cup holder assembly is damaged when forcibly withdrawn from one another. This invention addresses this need in the art as well as other needs, which will become apparent to those skilled in the art from this disclosure.

SUMMARY OF THE INVENTION

One object of the present invention is to provide a retractable cup holder assembly that breaks away from a trim panel after inadvertent or forcible removal of the cup holder assembly from the trim panel without damaging either the cup holder assembly or the trim panel.

Another object of the present invention is to provide a retractable cup holder assembly that is easily re-installed in a vehicle trim panel after inadvertent or forcible removal of the cup holder assembly from the vehicle trim panel.

In accordance with one aspect of the present invention, a retractable cup holder assembly includes an interior trim panel, a support housing and a retractable cup holder. The interior trim panel includes an attachment part and a cup holder receiving opening. The support housing is releasably retained in the cup holder receiving opening by a reusable breakaway connection. The breakaway connection at least partially releases the support housing from the interior trim panel for movement between an installed orientation and a breakaway orientation upon application of a prescribed force applied to the breakaway connection. The retractable cup holder is pivotally supported to the support housing about a pivot axis between a stowed position in which the cup holder is retracted and a deployed position in which the cup holder is extended outwardly from the support housing in a generally horizontally direction. The cup holder is connected with the support housing to move with the support housing when the support housing moves from the installed orientation to the breakaway orientation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a side cross-sectional view of the trim panel and cup holder assembly showing the cup holder assembly in the installed orientation and the cup holder tray in a retracted or stowed orientation in accordance with one embodiment of the present invention;

FIG. 9 is a side cross-sectional view of the trim panel and cup holder assembly similar to FIG. 8 showing the cup holder assembly in the breakaway orientation in accordance with one embodiment of the present invention;

FIG. 10 is a side elevational view of the cup holder assembly shown removed from the trim panel showing the cup holder tray in an intermediate orientation between the retracted or stowed orientation and the extended or deployed orientation in accordance with one embodiment of the present invention;

FIG. 11 is a side elevational view of the cup holder assembly similar to FIG. 10 showing the cup holder tray in the extended or deployed orientation in accordance with one embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
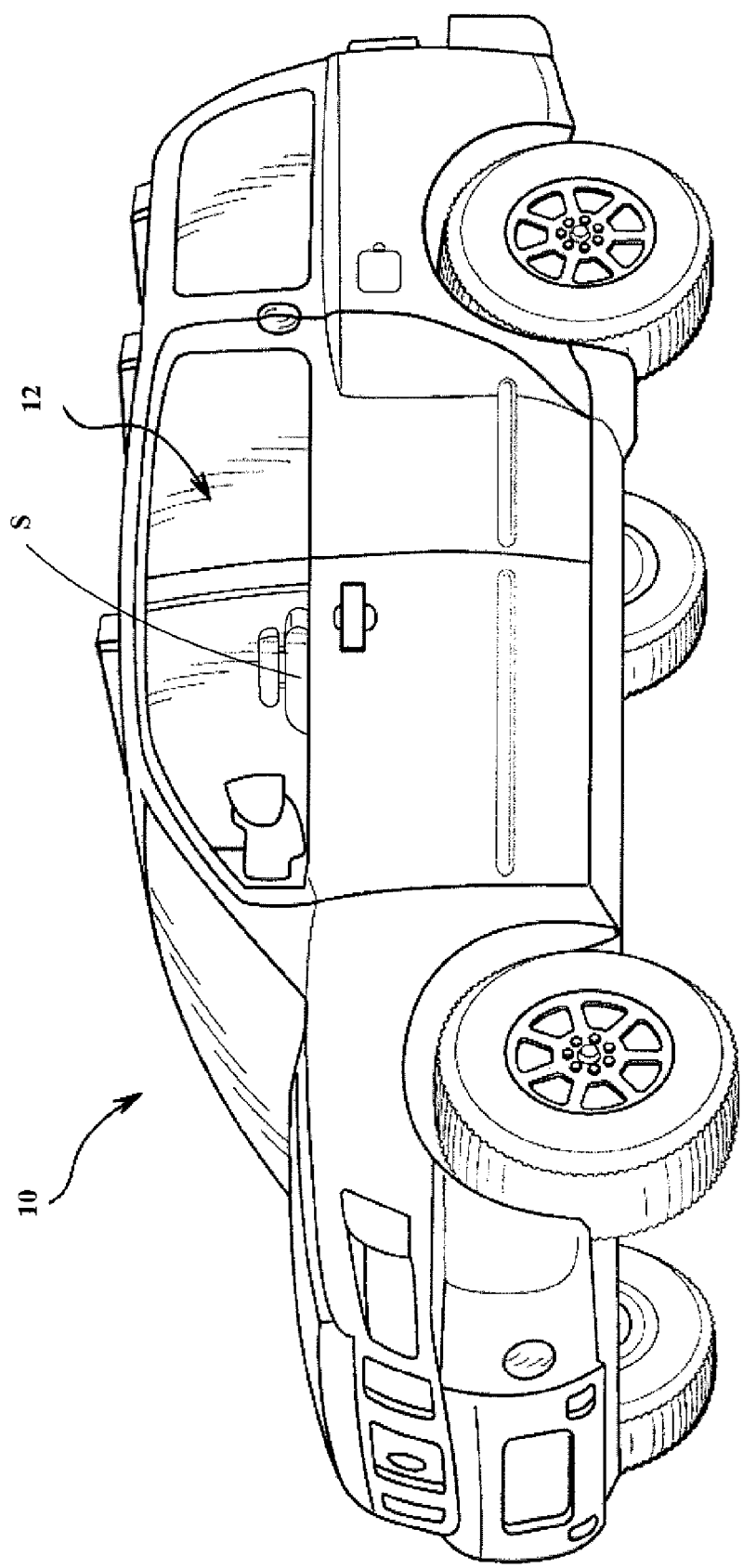
FIG. 1 is a perspective view of a vehicle having an interior that includes an interior trim panel in accordance with one embodiment of the present invention.

Referring initially to FIG. 1, a vehicle 10 having a vehicle interior 12 is illustrated in accordance with a first embodiment of the present invention.

Figure 2:
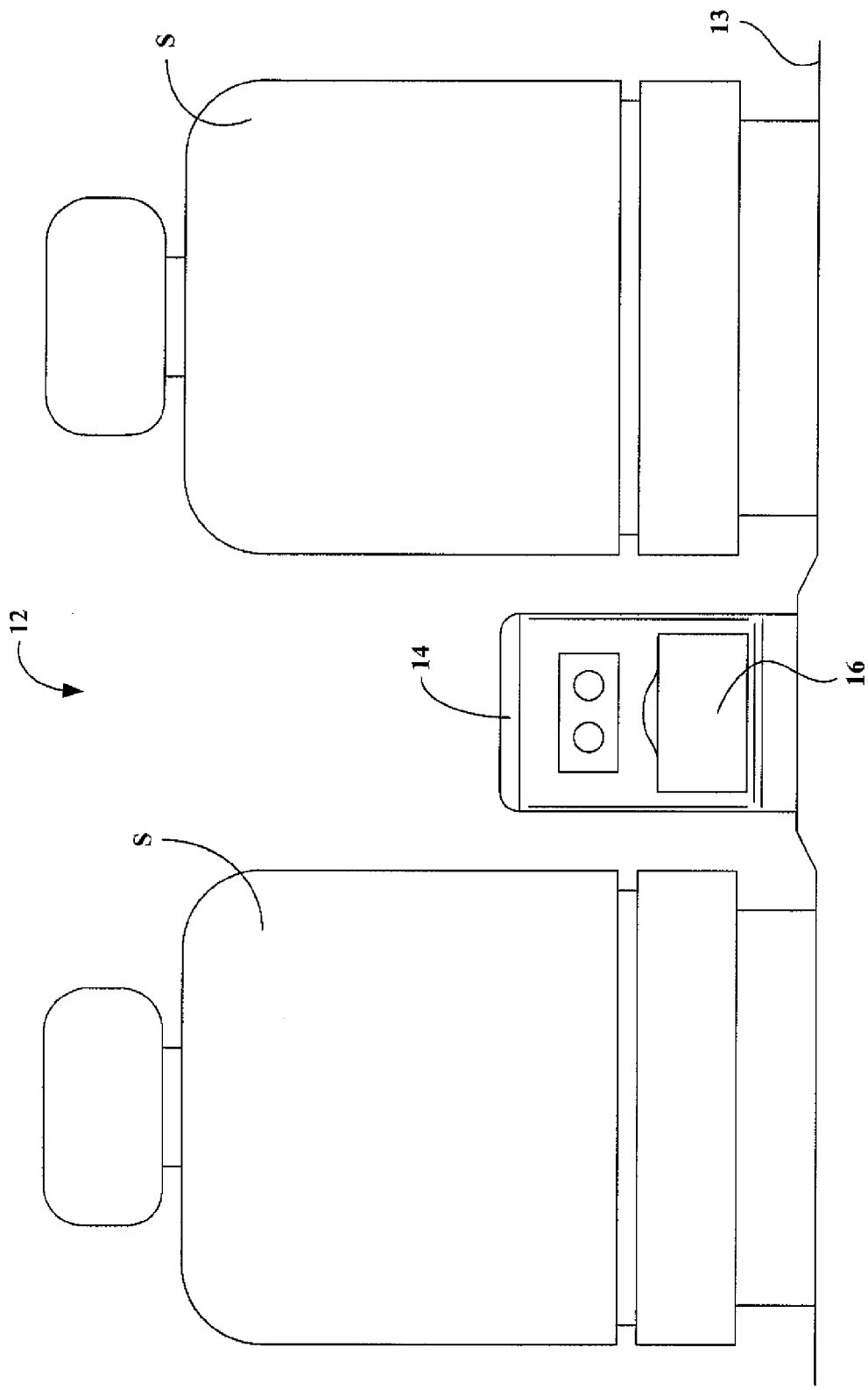
FIG. 2 is an elevational view of the interior of the vehicle depicted in FIG. 1 showing a trim panel of a center console that includes a cup holder assembly in accordance with one embodiment of the present invention.

As shown in FIG. 2, the vehicle interior 12 includes a floor 13, a pair of seats S and an interior trim panel 14 therebetween. The trim panel 14 is a center console that includes a retractable cup holder assembly 16. The trim panel 14 and the cup holder assembly 16 include a breakaway connection, as described in greater detail below. The breakaway connection of the trim panel 14 and the cup holder assembly 16 is configured such that when a prescribed force F (FIG. 4) is applied to the cup holder assembly 16, the cup holder assembly 16 breaks free from the trim panel 14 without damaging either of the cup holder assembly 16 or the trim panel 14.

The trim panel 14 is depicted as a center console located between two seats S. However, it should be understood from the drawings and the description herein that the trim panel 14 can be any of a variety of trim panels within the vehicle interior 12 of the vehicle 10. For example, the trim panel 14 can alternatively be part of a door, dashboard or a seat. In other words, the trim panel 14 is not limited to a center console of a vehicle.

Figure 4:
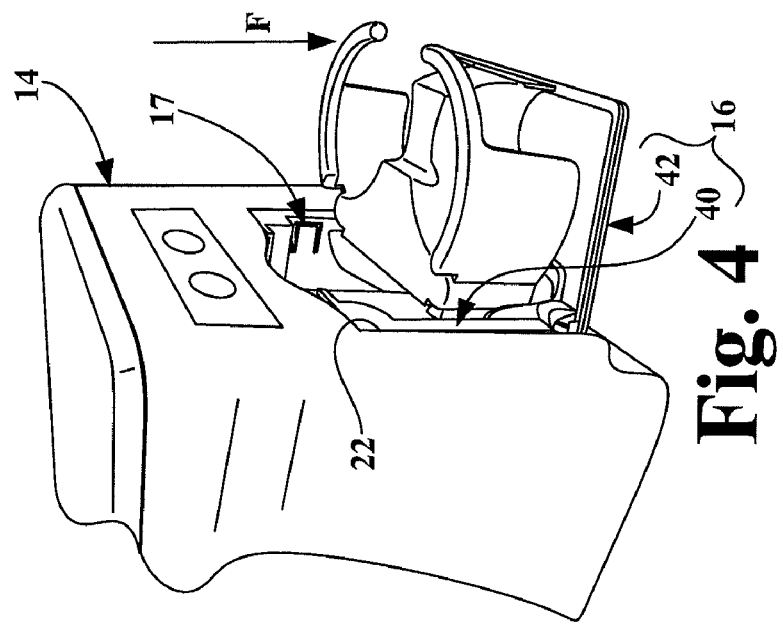
FIG. 4 is a perspective view of the trim panel similar to FIG. 3 showing the cup holder assembly in the installed orientation with a cup holder tray in a deployed or extended orientation in accordance with one embodiment of the present invention.
Figure 3:
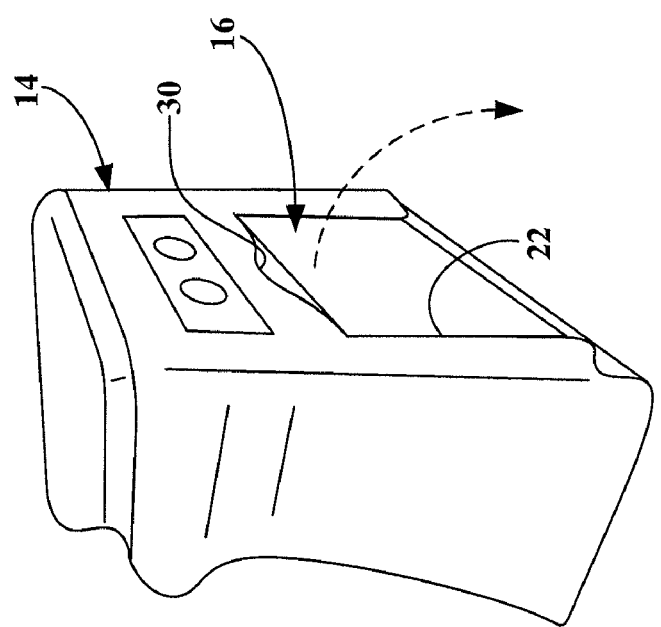
FIG. 3 is a perspective view of the trim panel showing the cup holder assembly in an installed orientation in accordance with one embodiment of the present invention.
Figure 5:
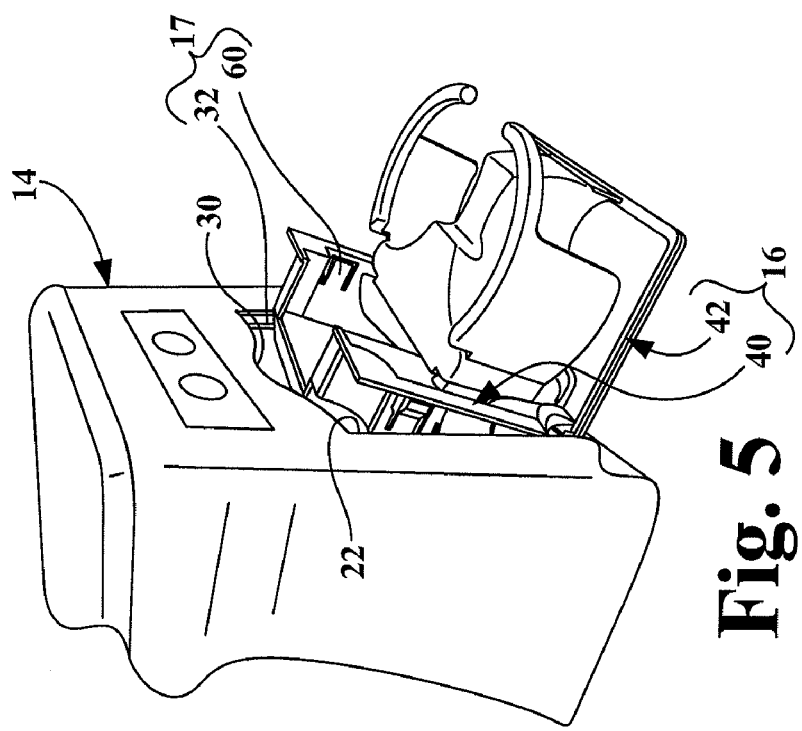
FIG. 5 is a perspective view of the trim panel similar to FIG. 3 showing the cup holder assembly in a breakaway orientation in accordance with one embodiment of the present invention.

As shown in FIGS. 3, 4 and 5, a portion of the cup holder assembly 16 is movable from a retracted or stowed position depicted in FIG. 3, to a deployed position depicted in FIG. 4. Upon application of the prescribed force F, the cup holder assembly 16 moves to a breakaway orientation, as depicted in FIG. 5. Thereafter, the cup holder assembly 16 can be completely removed, as indicated in FIG. 6, or can be easily re-installed.

Figure 6:
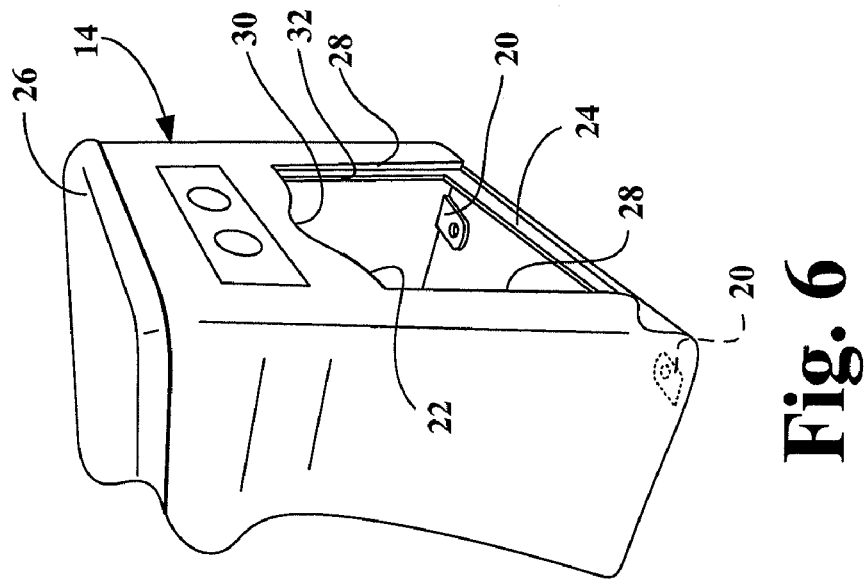
FIG. 6 is a perspective view of the trim panel similar to FIG. 3, showing details of the trim panel with the cup holder assembly completely removed to reveal details of the trim panel in accordance with one embodiment of the present invention.

With reference now to FIG. 6, a description of the trim panel 14 is now provided. The trim panel 14 is an interior trim panel that includes attachment parts 20, a cup holder receiving opening 22, a lower edge portion 24, and a concealed compartment (not shown) with, for example, a hinged lid 26.

The attachment parts 20 are provided in order to secure the trim panel 14 to the floor 13 (FIG. 2) of the vehicle interior 12. Specifically, fasteners (not shown) are inserted through apertures in the attachment parts 20 to secure the trim panel 14 to the floor 13. However, it should be understood from the drawings and description herein that the trim panel 14 can be secured to the floor 13 or other surfaces within the vehicle interior 12 by any of a variety of methods, such as welding or other fastening means.

Again with reference to FIG. 6, the cup holder receiving opening 22 is formed in one surface of the trim panel 14. The cup holder receiving opening 22 is preferably rectangular in shape with upright side walls 28 and a curved recess 30 formed along an upper edge thereof. The lower edge portion 24 defines the lower end of the cup holder receiving opening 22. The lower edge portion 24 forms part of a pivotal connection between the trim panel 14 and the cup holder assembly 16, as described in greater detail below. The side walls 28 each include a contact surface 32 (shown in FIGS. 14-16) that forms a part of the breakaway connection, as described in greater detail below.

Figure 7:
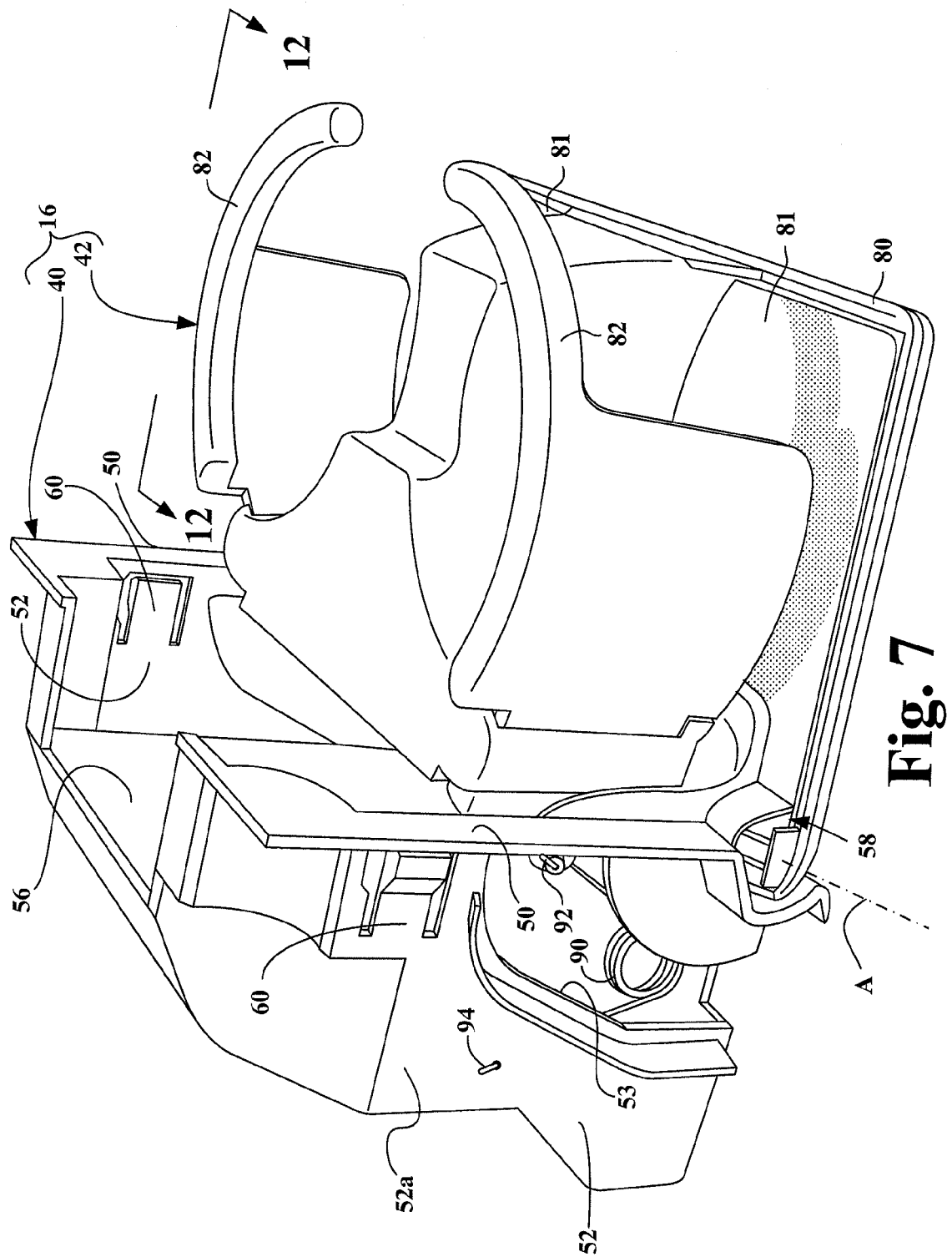
FIG. 7 is a perspective view of the cup holder assembly removed from the trim panel showing a support housing and the cup holder tray with the cup holder tray in the deployed or extended orientation in accordance with one embodiment of the present invention.

With specific reference to FIGS. 7-12, a description of the cup holder assembly 16 is now provided. In FIG. 7, the cup holder assembly 16 is shown completely removed from the trim panel 14. The cup holder assembly 16 basically includes a support housing 40 and a retractable cup holder tray 42. Relative to the support housing 40, the cup holder tray 42 is movable between an extended or deployed orientation depicted in FIGS. 4, 7 and 11 and a stowed or retracted orientation depicted in FIGS. 3 and 8, as described in greater detail below.

The support housing 40 is releasably retained in the cup holder receiving opening 22 by the reusable breakaway connection such that the breakaway connection at least partially releases the support housing 40 from the trim panel 14 for movement between an installed orientation shown in FIGS. 3, 4 and 8, and a breakaway orientation shown in FIGS. 5 and 9.

The support housing 40 is preferably made of a plastic or moldable material and includes fascia side walls 50, upright walls 52, lower projections 54 and 55 (shown in FIGS. 8-11), a hollow interior 56, a pivot portion 58 and a pair of detents 60. The fascia side walls 50 are concealed with the cup holder tray 42 in the retracted orientation and are visible with the cup holder tray 42 in the extended orientation. Each of the upright walls 52 includes an arcuate opening 53 and one of the detents 60. The lower projections 54 and 55 (visible in FIGS. 8-11) are spaced apart from one another form part of the pivotal connection coupling the support housing 40 to the trim panel 14 for movement of the support housing 40 between the installed orientation and the breakaway orientation.

The pivotal connection is defined by the lower projections 54 and the lower edge portion 24 of the cup holder receiving opening 22 in the trim panel 14. The lower projections 54 and 55 are configured to extend around opposite sides of the lower edge portion 24, as depicted in FIGS. 8 and 9. More specifically, movement of a lower end of the cup holder assembly 16 is restrained relative to the trim panel 14 by contact between the lower projections 54 and 55 and the lower edge portion 24.

Consequently, the support housing 40 is pivotal about the lower edge portion 24, as indicated in FIGS. 8 and 9.

Figure 12:
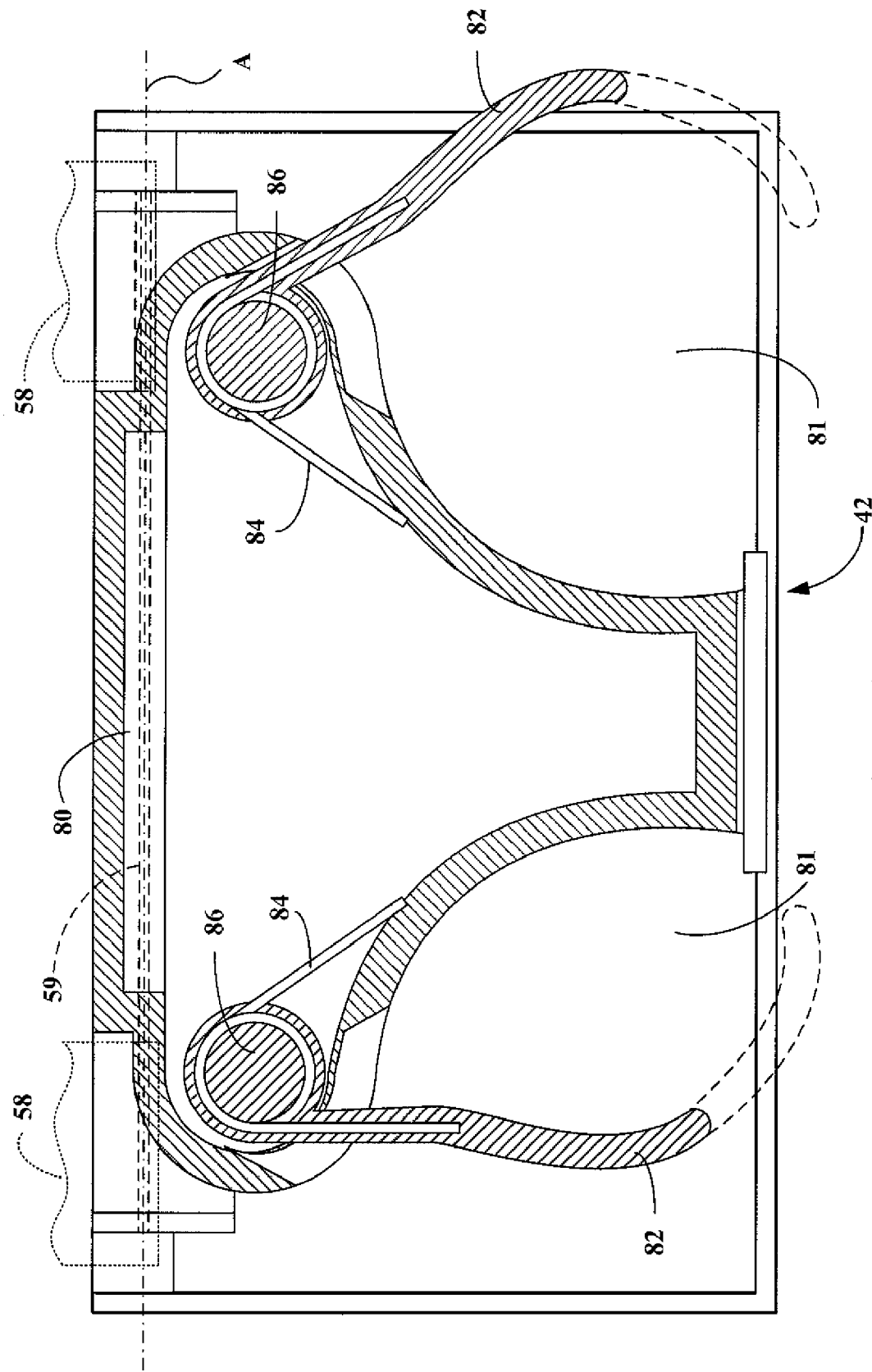
FIG. 12 is a cross-sectional view of the cup holder tray taken along the line 12-12 in FIG. 7 showing fluid container retaining portions in accordance with one embodiment of the present invention.

The pivot portion 58 includes a pivot axis A (FIG. 7) that extends through a lower portion of the support housing 40. As indicated in FIG. 12, a pivot shaft 59 extends along the pivot axis A within the pivot portion 58.

A description of the detents 60 is now provided with specific reference to FIGS. 13-16. Each of the upright walls 52 includes one of the detents 60. Since the upright walls 52 and the detents 60 are symmetrical to one another but otherwise identical, description of one of the detents 60 applies to both. Therefore description of only one detent 60 is provided for the sake of brevity.

Figure 13:
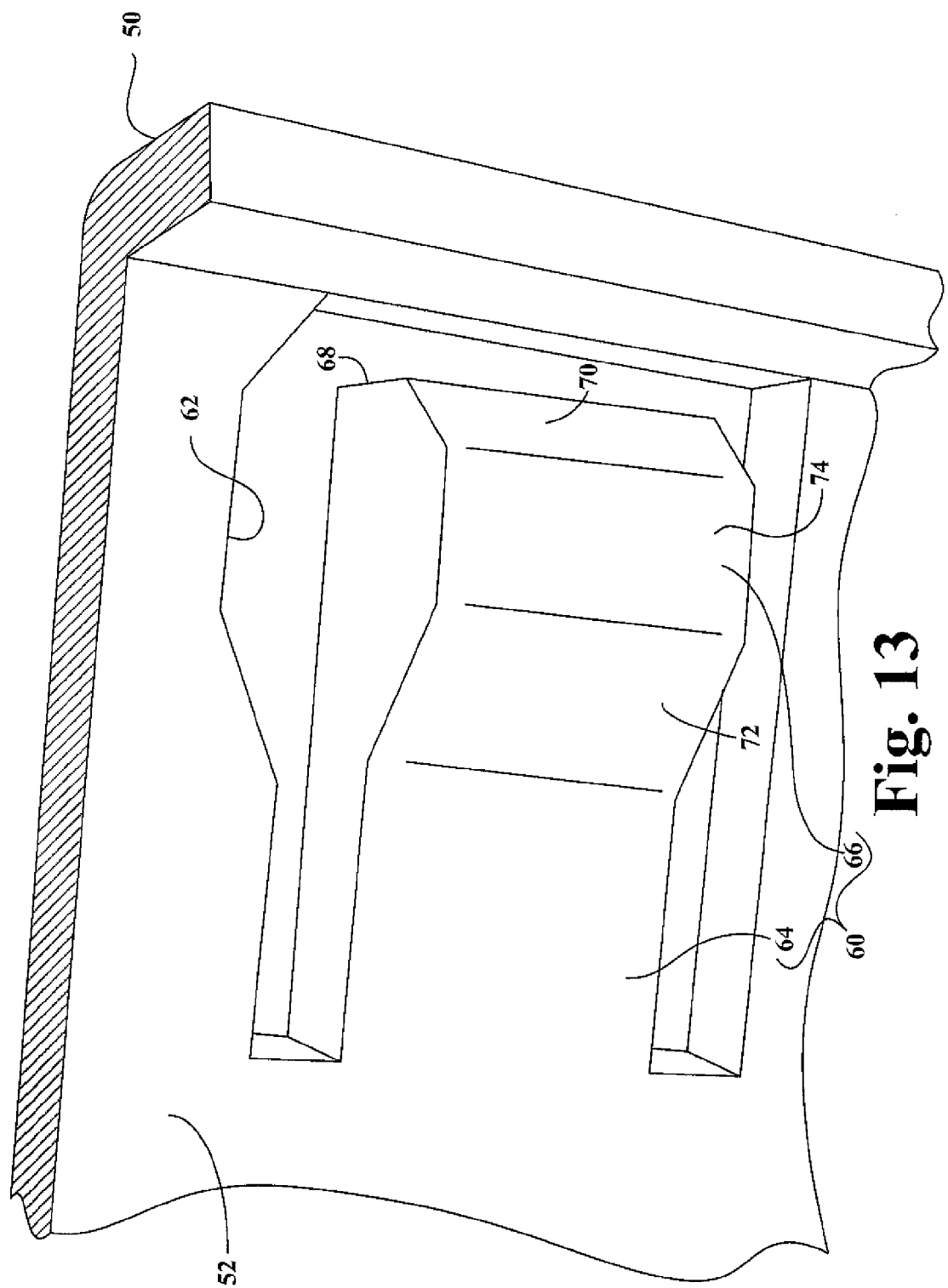
FIG. 13 is an enlarged perspective view of the support housing of the cup holder assembly showing a detent that forms a part of a breakaway connection between the trim panel and the cup holder assembly in accordance with one embodiment of the present invention.
Figure 16:
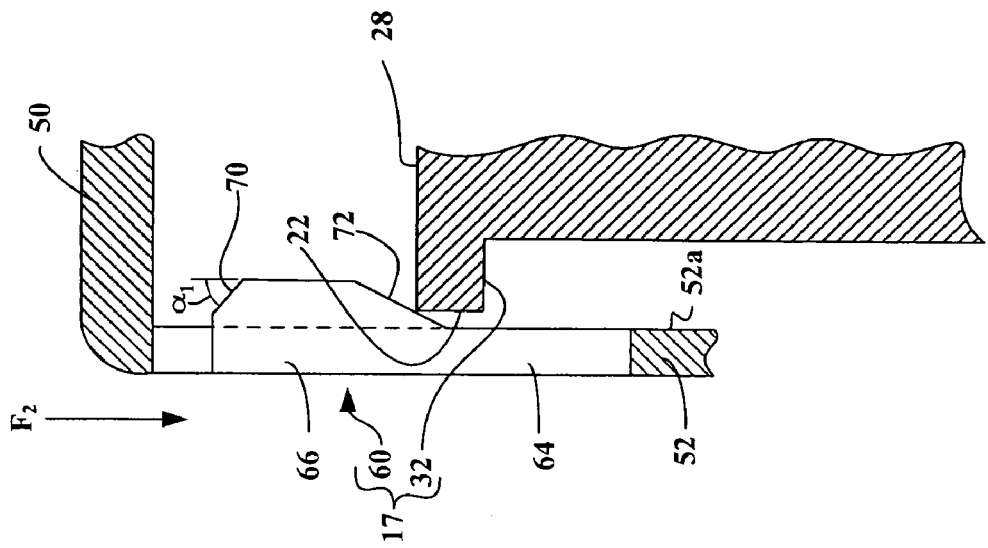
FIG. 16 is another cross-sectional view similar to FIGS. 14 and 15 showing the detent returned to a non-deflected position with the support housing and the cup holder assembly moved from the installed orientation to the breakaway orientation in accordance with one embodiment of the present invention.
Figure 14:
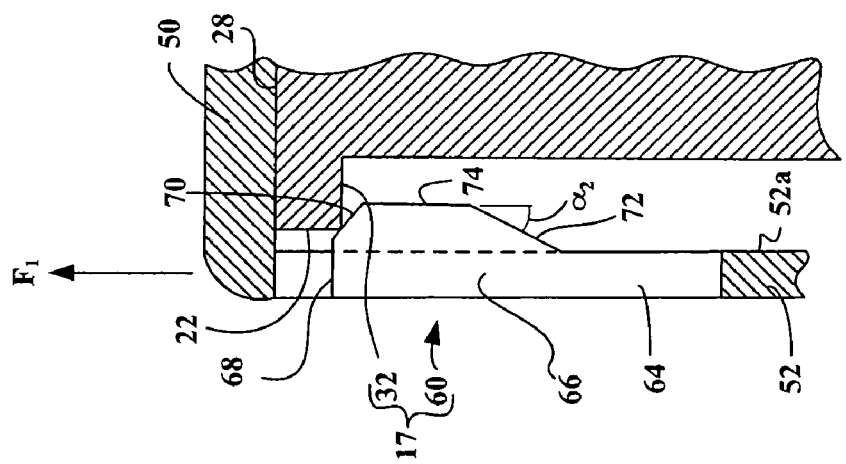
FIG. 14 is a cross-sectional view of portion of the support housing in the region of the detent and a contact surface of trim panel, the contact surface and the detent forming the breakaway connection between the trim panel and the cup holder assembly in accordance with one embodiment of the present invention.

As shown in FIG. 13, the detent 60 is basically a cantilevered projection extending from a portion of the upright wall 52 within a cutaway or aperture 62 formed in the upright wall 52. The cutaway or aperture 62 partially surrounds the detent 60 separating it from the upright wall 52. The detent 60 has main body 64 and a distal end 66. The main body 64 has a generally uniform thickness. The distal end 66 has an increased thickness such that the distal end 66 extends outward beyond a plane defined by an outer surface 52a of the upright wall 52, as indicated in FIGS. 14 and 16. The increased thickness at the distal end of the detent 60 is defined by several surfaces, including an end surface 68, a first inclined surface 70, a second inclined surface 72 and a planar surface 74 that extends between the first and second inclined surfaces 70 and 72.

Figure 15:
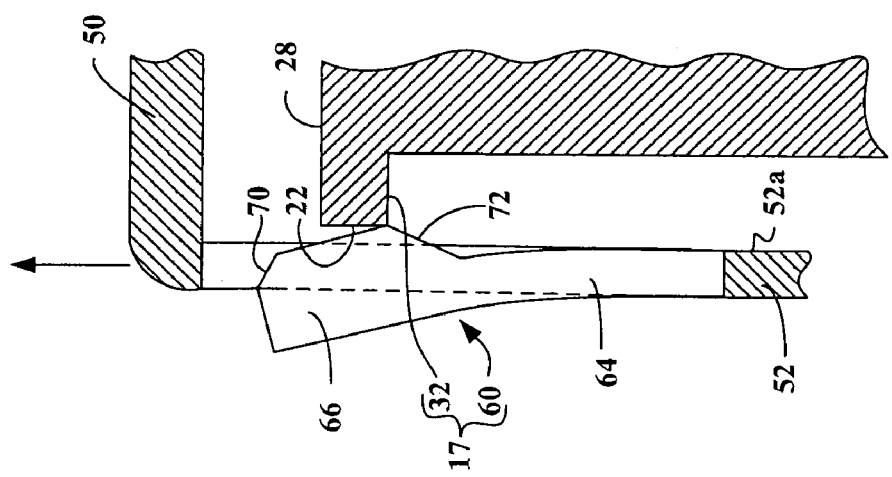
FIG. 15 is another cross-sectional view similar to FIG. 14 showing the detent deflected allowing the support housing and the cup holder assembly to move from the installed orientation toward the breakaway orientation in accordance with one embodiment of the present invention.

With specific reference to FIGS. 14-16, a description is now provided of the breakaway connection. The breakaway connection includes the contact surface 32 and the detent 60. The breakaway connection between the trim panel 14 and the support housing 40 includes the cantilevered detent 60. The distal end 66 of the detent 60 is releasably engagable with the trim panel 14. More specifically, the first inclined surface 70 (the breakaway ramped surface) of the cantilevered detent 60 extends in a direction that is angularly inclined with respect to the contact surface 32 with the support housing 40 in the installed orientation.

The planar surface 74 extends in a direction that is parallel to the main body 64 with the detent 60 in a non-deflected orientation or at rest orientation depicted in FIGS. 14 and 16. As best shown in FIG. 16, the first inclined surface 70 is inclined or angularly offset from the planar surface 74 by an angle $\alpha_1$. The first inclined surface 70 is a breakaway ramped surface oriented to releasably engage the corresponding contact surface 32 on the trim panel 14 with the cup holder assembly 16 in the installed orientation, as indicated in FIG. 14.

As best shown in FIG. 14, the second inclined surface 72 is inclined or angularly offset from the planar surface 74 by an angle $\alpha_2$. The angle $\alpha_1$ is greater than the angle $\alpha_2$.

In FIG. 14, the cup holder assembly 16 is in the installed orientation corresponding to the orientation shown in FIGS. 3, 4 and 8. The cup holder assembly 16 remains in the installed orientation due to the contact between the first inclined surface 70 and the contact surface 32. The angle $\alpha_1$ of the first inclined surface 70 is preferably chosen such that the force $F_1$ necessary to move the cup holder assembly 16 out of the installed orientation is sufficient to retain the cup holder assembly 16 in the installed orientation during normal usage of the cup holder assembly 16. However, if the force $F_1$ is sufficiently high, the detents 60 deflect as indicated in FIG. 15 and the cup holder assembly 16 is released undamaged from the trim panel 14.

It should be understood that the force F in FIG. 4 and the force $F_1$ are proportional to one another such that the force $F_1$ corresponds to approximately half of the force F since there two detents 60 (and taking into account the moment about the pivot portion 58). Therefore, the specific numeric value of the angle $\alpha_1$ can be determined based upon the overall dimensions and shape of the cup holder assembly 60; the moment about the pivot connection between the support housing 40 and the lower edge portion 24 of the trim panel 14; the strength of the material used to manufacture the various portions of the cup holder assembly 16; the spring constant of the detent 60; and the anticipated weight of average load placed upon the cup holder tray 42.

More specifically, the angle $\alpha_1$ is determined such that detents 60 remain engaged with the contact surface 32 of the trim panel 14 during normal use and the detents 60 deflect when excessive force is placed on the cup holder tray 42 thereby allowing the cup holder assembly 16 to move to the breakaway orientation without damage to either the cup holder assembly 16 or the trim panel 14.

In FIG. 15, the cup holder assembly 16 is shown being moved away from the installed orientation toward the breakaway orientation. As indicated in FIG. 15, the detent 60 deflects in response to the force $F_1$ allowing the cup holder assembly 16 to be released from the installed orientation.

In FIG. 16, the cup holder assembly 16 is shown moved completely out of the installed orientation and moved further toward the breakaway orientation depicted in FIGS. 5 and 9.

As indicated in FIG. 16, a force $F_2$ can be applied to the support housing 40 to re-install the cup holder assembly 16 and put it back into the installed orientation. During re-installation of the cup holder assembly 16, the second inclined surface 72 contacts the upright side wall 28 and the detent 60 deflects allowing re-installation of the cup holder assembly 16. The angle $\alpha_2$ is specifically determined such that the force $F_2$ necessary to re-install the cup holder assembly 16 is less than the force $F_1$. Hence, the angle $\alpha_2$ is less than the angle $\alpha_1$. Since the angle $\alpha_2$ is less than the angle $\alpha_1$ the force $F_2$ required to reinstall the cup holder assembly 16 is less than the force $F_1$. Less force is needed to re-install the cup holder assembly 16 than is required to move the cup holder assembly 16 from the installed orientation to the breakaway orientation.

With specific reference to FIGS. 7 and 12, a description of the cup holder tray 42 is now provided. The cup holder tray 42 is retractable with respect to the support housing 40 as shown in FIGS. 3, 4, 8 and 11. More specifically, the cup holder tray 42 is movable between the stowed or retracted orientation shown in FIGS. 3 and 8 and the extended orientation shown in FIGS. 4 and 11. In the extended orientation, the cup holder tray 42 extends outwardly from the support housing 40 in a generally horizontal direction. The cup holder tray 42 is connected to the support housing 40 to move with the support housing 40 when the support housing 40 moves from the installed orientation to the breakaway orientation.

The cup holder tray 42 basically includes a pivot portion 80, two fluid container retaining portions 81, two fluid container retaining arms 82, biasing members 84, shaft members 86, stop members 88 and overcenter spring 90. The pivot portion 80 of the cup holder tray 42 is coupled to the pivot portion 58 of the support housing 40 by the pivot shaft 59, as indicated in FIG. 12. The pivot shaft 59 extends through both the pivot portion 58 of the support housing 40 and the pivot portion 80 of the cup holder tray 42. The fluid container retaining arms 82 (spring biased container retaining arm) include arcuate extensions shaped to contact and retain a fluid container such as a cup (not shown). The fluid container retaining arms 82 pivot about the shaft members 86 and are biased into contact with cups by the biasing members 84.

The stop members 88 are dimensioned to extend into respective ones of the arcuate openings 53 of the upright walls 52 of the support housing 40, as indicated in FIGS. 7-11. The stop members 88 limit the movement of the cup holder tray 42. Each of the overcenter springs 90 includes a first end 92 and a second end 94. The first end 92 is inserted into an aperture in a respective one of the stop members 88. The second end 94 is inserted into a small aperture in the upright wall 52, as indicated in FIGS. 7 and 10-11.

The various portions of the vehicle 10 are conventional components that are well known in the art. Since vehicles such as the vehicle 10 are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A retractable cup holder assembly comprising:
   an interior trim panel including a receiving opening;
   a support housing releasably retained in the opening of the interior trim panel by a reusable breakaway connection such that the breakaway connection holds the support housing in an installed orientation within the opening of the interior trim panel and at least partially releases the support housing from a part of the interior trim panel for movement from the installed orientation to a breakaway orientation upon application of a prescribed force being applied to the breakaway connection; and
   a retractable cup holder pivotally supported to the support housing about a pivot axis between a stowed position in which the cup holder is retracted with respect to the support housing and a deployed position in which the cup holder is extended outwardly from the support housing in a generally horizontal direction with respect to the support housing while the support housing is in the installed orientation, the cup holder being connected with the support housing to move with the support housing when the support housing moves from the installed orientation to the breakaway orientation.

2. The retractable cup holder assembly according to claim 1, wherein
   the support housing includes a pivotal connection coupling the support housing to the interior trim panel for movement of the support housing between the installed orientation and the breakaway orientation.

3. The retractable cup holder assembly according to claim 2, wherein
   the pivotal connection includes a lower edge portion of the opening, and
   the support housing includes at least one projection extending from a lower portion of the support housing configured to couple to the lower edge portion of the opening.

4. The retractable cup holder assembly according to claim 1, wherein
   the support housing is removable from the interior trim panel with the support housing in the breakaway orientation and reinstallable to the interior trim panel.

5. The retractable cup holder assembly according to claim 1, wherein
   the pivot axis extends through a lower portion of the support housing.

6. The retractable cup holder assembly according to claim 1, wherein
   the retractable cup holder includes two fluid container retaining portions.

7. The retractable cup holder assembly according to claim 6, wherein
   each of the fluid container retaining portions includes a spring biased container retaining arm.

8. The retractable cup holder assembly according to claim 1, wherein
   the breakaway connection at least partially releases the support housing from the part of the interior trim panel for movement from the installed orientation to the breakaway orientation upon application of the prescribed force being applied to the breakaway connection with an orientation of the support housing with respect to the retractable cup holder remaining unchanged.

* * * * *